3,081,357
PROCESS FOR PRODUCING ALKANEDIOLS
Thomas Alderson, Wilmington, and Richard V. Lindsey, Jr., Hockessin, Del., assignors to E. I. du Pont de Nemours and Company, Wilmington, Del., a corporation of Delaware
No Drawing. Filed May 24, 1960, Ser. No. 31,261
7 Claims. (Cl. 260—635)

This invention relates to new and useful methods for preparing alkanediols containing at least 5 carbon atoms per molecule.

The two-carbon alkanediol, ethylene glycol is a very large tonnage industrial chemical prepared commercially from ethylene via the chlorohydrin reaction, followed by hydrolysis. It can also be made by reacting formaldehyde with carbon monoxide and hydrogen and by the high pressure hydrogenation of glycolic acid. Good methods for synthesizing higher alkanediols from readily available intermediates have not hitherto been available.

More specifically, this invention provides a general method for preparing alkanediols containing at least 5 carbon atoms and having the hydroxyls on primary carbon atoms from readily available, low-cost intermediates. These higher alkanediols are obtained by reacting under elevated temperatures and pressures acyclic diene hydrocarbons with carbon monoxide, formaldehyde, and hydrogen in the presence of a catalytic amount of a salt, chelate, or carbonyl of a group VIII noble metal.

In the acyclic diene hydrocarbon used in the practice of this invention the double bonds can be cumulative, conjugated, or isolated. Thus, a suitable acyclic diene hydrocarbon for use in the present invention is the three-carbon diene, allene. The process is operable with any diene hydrocarbon, irrespective of its chain length, but for reasons of availability the diene hydrocarbons generally used will usually contain not more than 18 carbon atoms.

In the practice of this invention any acyclic diene hydrocarbon can be used. The unsaturation in the diene can be cumulative, or it can be conjugated, or the double bonds can be isolated. Examples of diene hydrocarbon having cumulative double bonds include propadiene-1,2, butadiene-1,2, pentadiene-1,2, and the like. Examples of diene hydrocarbons having conjugated double bonds include butadiene-1,3, pentadiene-1,3, hexadiene-1,3, and the like. Examples of diene hydrocarbons having isolated double bonds include pentadiene-1,4, 3-methylhexadiene-1,4, 2-ethylhexadiene-1,4, 4-propylhexadiene-1,4, hexadiene-1,5, dodecadiene-1,4, and the like. The preferred diene hydrocarbons are those which contain less than eight carbon atoms because they are readily available and react readily with formaldehyde, carbon monoxide, and hydrogen to give good yields of glycols.

Dienes containing 8 to 18 carbon atoms are a less preferred class of hydrocarbons because the products obtained are complex in composition. The structure of these products will be determined by the positions of the carbon-carbon unsaturation in the molecule and the structure and length of the carbon skeleton. The alkanediols prepared with these 8 to 18 carbon diene hydrocarbons, however, contain the hydroxyl groups on primary carbons.

Instead of using the pure diene hydrocarbon there can be used mixtures of hydrocarbons containing substantial amounts of diene hydrocarbon component. The use of such mixtures constitutes a less preferred embodiment because it complicates separation procedures and adds to costs.

The carbon monoxide, formaldehyde, and hydrogen used in the processes of this invention can be either the chemically pure products or they can be of commercial purity.

Generally, paraformaldehyde is used as the source of formaldehyde but it is to be understood that this preference is only for practical reasons and any source of monomeric formaldehyde can be employed.

The alkanediols produced by the processes of this invention are theoretically formed from the reaction of 1 mole each of formaldehyde, carbon monoxide, and diene hydrocarbon with 2 moles of hydrogen. In general, in order to favor the production of the desired alkanediols and to minimize by-product formation, it is preferred to employ the diene hydrocarbon and formaldehyde in a 1:2 mole ratio and to employ such amounts of hydrogen and carbon monoxide that there will always be present in any given reaction system excess hydrogen beyond that needed to make up a 1:1 mole ratio between hydrogen and carbon monoxide. Hence, in a preferred embodiment of the invention, there is employed formaldehyde, carbon monoxide, and diene hydrocarbon in 2:1:1 mole ratio, there being additionally present more than enough hydrogen to make a 1:1 mole ratio with any one of these three other reactants.

In a practical situation, one will usually use from 2 to 4 moles of formaldehyde, from 2 to 10 moles of carbon monoxide, and from 4 to 20 moles of hydrogen per mole of diene hydrocarbon.

As a catalyst for carrying out the processes of the present invention, there is employed a salt, chelate, or carbonyl of a group VIII noble metal. Group VIII noble metals include ruthenium, rhodium, palladium, osmium, iridium, and platinum.

Preferred chelates are those of $\beta$-dicarbonyl compounds because of their ready availability. It is to be understood, however, that any chelate of a group VIII noble metal can be used.

Specific examples are ruthenium (II) dichloride, ruthenium (III) bromide, ruthenium (III) chloride, ruthenium (III) iodide, rhodium (IV) chloride, rhodium (III) chloride, rhodium (III) formate, ruthenium (IV) acetate, diruthenium nonacarbonyl, $Ru_2(CO)_9$, monoruthenium pentacarbonyl, $Ru(CO)_5$, rhodium tetracarbonyl, $$[Rh(CO)_4]_2$$

and $[Rh(CO)_4]_x$, rhodium tetracarbonyl hydride, $$RH(CO)_4H$$

rhodium dicarbonyl chloride, diiridium octacarbonyl, $Ir_2(CO)_8$, ruthenium (III) acetonylacetonate, platinum dicarbonyl dichloride, $[Pt(CO)_2Cl_2]$, platinum carbonyl dibromide, $Pt(CO)Br_2$, rhodium (III) acetylacetonate, rhodium (III) bis(dibenzoylmethanate)monoacetate, bis-(2-pyridine aldehyde) rhodium (III) chloride, rhodium (III) ethyl acetoacetate chelate, chelate of ruthenium with 5,8 - diaza-4,9-dimethyl-4,8-dodecadiene-2,11-dione, platinum (II) chloride, platinum (IV) iodide, osmium (IV) chloride, iridium (III) bromide, and the like.

In general, the preferred catalysts are the halides, particularly the chlorides, because they give superior yields of desired glycols.

In general, the processes of the present invention are conducted in the presence of a catalytic amount of a chelate, carbonyl, or salt of a group VIII noble metal, which may be up to 15% by weight of the total diene hydrocarbon charged to the reactor but is usually in the range of 1–6% and may be in amounts as low as 0.0001%. Usually larger amounts in the range of 0.10% are used to obtain practical rates of reaction.

Also, in general, the chelates, salts, and carbonyls used are those compounds of the group VIII noble metals which are soluble in the reaction medium to an amount which is sufficient to provide a solution of at least 0.0001% thereof, based on the total diene hydrocarbon charged to the reactor.

Although the processes of the present invention can be carried out by simply admixing the reactants and catalyst under the appropriate temperatures and pressures, it is preferred to carry out these processes in the presence of an inert reaction medium. This medium can be aqueous or non-aqueous. A preferred organic medium is diethylene glycol dimethyl ether because of its good solvency characteristics for the reactants and reaction products. In place of the diethylene glycol dimethyl ether, one can employ diethylene glycol dipropyl ether, diethylene glycol dibutyl ether, and the like. Irrespective of whether water alone is the medium, or whether water and an organic medium are used in admixture, or whether an organic solvent is used alone, the total amount of added inert reaction medium used can equal or exceed by 10 or more fold the combined weights of the reactants charged to the reactor.

The process is carried out at temperatures which are at least 100° C. and usually below 250° C. Most generally the reaction is carried out between 120° and 200° C. because within this range the best yields of alkanediol are obtained.

The reaction by which the alkanediols are formed is one which requires the use of a positive pressure which will generally be at least 100 atmospheres and usually above 200 atmospheres. There is no advantage from the use of pressures above 3000 atmospheres and this constitutes a practical upper pressure limit.

In general, the products are separated by conventional distillation procedures.

In practice, a pressure reactor is charged with catalyst, the reactor is closed, cooled to 0° C. or lower, evacuated, predetermined amounts of diene hydrocarbon and formaldehyde are added, and the charged reactor is then placed in a shaker box. Thereafter a 1:2 or 1:1 carbon monoxide:hydrogen mixture is added so that at 100° C. a total pressure of at least 100 atmospheres is developed within the reactor. The charge is agitated and heated at 100° to 250° C. until there is no further reaction, as evidenced by cessation of pressure drop. Throughout the reaction period the pressure is maintained by injection of fresh hydrogen and carbon monoxide. After reaction is complete, the reactor is allowed to cool, unreacted diene hydrocarbon, carbon monoxide, and hydrogen are separated, and the reactor is discharged. The desired alkanediol is isolated from the reaction mixture by fractional distillation, preferably under reduced pressure, or other method known to those skilled in the art.

In an alternative procedure the reactor may be charged with catalyst, diene hydrocarbon, and formaldehyde and then pressured with carbon monoxide, followed by hydrogen.

It is to be understood, however, that there is nothing critical about the order of charging the reactants to the reactor and therefore that they may be added in any order which is convenient and practical.

The examples which follow illustrate but do not limit this invention. Unless otherwise stated, the reactor corresponds to one having a capacity corresponding to 400 ml. of water and parts are by weight. Yields given are based on the weight of diene hydrocarbon charged to the reactor.

EXAMPLE I

A pressure reactor was charged with 90 parts of diethylene glycol dimethyl ether, 30 parts of paraformaldehyde, and one part of rhodium (III) chloride. The reactor was cooled and evacuated, 30 parts of 1,3-butadiene was distilled in and the system was pressured with a mixture of hydrogen and carbon monoxide in a 2:1 mole ratio to give an operating pressure of 700 atm. at 140° C. The reactants were shaken under these conditions for 16 hours. A pressure drop of 455 atm. was observed during the reaction period. There was recovered from the reactor 182 parts of red-brown liquid which was flash distilled to give 177 parts of distillate and four parts of higher-boiling residue. The distillate was fractionally distilled to yield 15 parts of methanol, B.P. 62–66° C., $n_D^{25}$ 1.3359, identified by infrared analysis (methanol B.P. 64–65° C., $n_D^{15}$ 1.3307); two parts of ethyl propionate, B.P. 66–89° C., $n_D^{25}$ 1.3942, identified by infrared analysis; 22 parts of n-amyl alcohol, B.P. 139° C., $n_D^{25}$ 1.4085, identified by infrared analysis (n-amyl alcohol B.P. 138° C., $n_D^{25}$ 1.4077); 25 parts of ethane-1,2-diol, B.P. 183–212° C., $n_D^{25}$ 1.4341, identified by infrared analysis (ethane-1,2-diol B.P. 197.85° C., $n_D^{25}$ 1.4307); 20 parts of hexane-1,6-diol, B.P. 261–280° C., $n_D^{25}$ 1.4452–1.4498, identified by infrared analysis.

*Anal.*—Calcd. for $C_6H_{14}O_2$: C, 61.1%; H, 11.86%. Found: C, 61.59%; H, 11.00%.

Nuclear magnetic resonance analysis indicates resonance for two hydroxyl hydrogens, four hydrogens adjacent to hydroxyl groups, four hydrogens one carbon removed from the carbon holding the hydroxyl group, and four hydrogens attached to carbon atoms not influenced by the hydroxyl group, e.g., the necessary resonances for hexane-1,6-diol. The phenyl urethane was prepared from the $C_6$ diol, M.P. 163–166° C. The phenyl urethane prepared from known $C_6$ diol had a melting point of 163–166° C. The mixed M.P. of these two compounds showed no depression [bis-phenyl urethane of hexamethylene glycol, M.P. 171–172° C., Hamonet, Compt. Rend. 136, 245 (1903)].

EXAMPLE II

A pressure reactor was charged with 90 parts of diethylene glycol dimethyl ether, 30 parts of paraformaldehyde, and one part of ruthenium (III) chloride. The reactor was cooled and evacuated, 30 parts of butadiene was distilled in and the system was pressured with a mixture of hydrogen and carbon monoxide in a 2:1 mole ratio to give an operating pressure ranging from 450–1000 atm. at 125–190° C. The reactants were shaken under these conditions for 16 hours and a pressure drop of 925 atm. was observed. There was recovered from the reactor 169 parts of red-brown liquid which was flash distilled to give 160 parts of distillate and 4.2 parts of higher-boiling residue. The distillate was fractionally distilled to give three parts of methyl formate, B.P. 39° C., $n_D^{25}$ 1.3439, identified by infrared analysis; 16 parts of methanol, B.P. 59–64° C., $n_D^{25}$ 1.3347, identified by infrared analysis; 21 parts of hexane-1,6-diol, B.P. 262–275° C., identified by infrared analysis; and five parts of linear aliphatic esters, B.P. 275–298° C., $n_D^{25}$ 1.4516.

EXAMPLE III

A pressure reactor was charged with 90 parts of diethylene glycol dimethyl ether, 30 parts of paraformaldehyde, 40 parts of 1,4-hexadiene and one part of rhodium (III) chloride. The reactor was cooled and evacuated and pressured with a mixture of hydrogen and carbon monoxide in a 2:1 mole ratio to give a pressure of 400–1000 atm. at operating temperatures of 140–175° C. The reactants were shaken under these conditions for five hours. A pressure drop of 280 atm. was observed during the reaction period. There was recovered from the reactor 183 parts of red-brown, somewhat viscous liquid which was flash distilled to give 166 parts of distillate and 12 parts of higher-boiling viscous materials. The distillate was fractionally distilled to yield 16 parts of methanol, B.P. 63° C., identified by infrared analysis; 15 parts of ethane-1,2-diol, B.P. 197–219° C., $n_D^{25}$ 1.4351, identified by infrared analysis; and 24 parts of octamethylene glycol, B.P. 280–299° C., identified by infrared analysis.

*Anal.*—Calcd. of $C_8H_{18}O_2$: C, 66.58%; H, 12.32%. Found: C, 66.08%; H, 11.05%.

The phenyl urethane from this sample of octamethylene glycol had a M.P. of 168–170° C. The phenyl urethane was also prepared from a known sample of octamethylene glycol, M.P. 162–168° C. The mixed M.P. of these two compounds showed no depression [bis-phenyl urethane of octamethylene glycol M.P. 172–172.5 (Lespian, Compt. Rend. 158, 1188 (1914)]. Nuclear magnetic resonance analysis showed the proper resonances for two hydroxyl groups, two hydrogens on each of the carbons holding the hydroxyl groups, two hydrogens on each of the β-carbon atoms of the glycol, and four internal $CH_2$ groups.

EXAMPLE IV

A pressure reactor was charged with 90 parts of diethylene glycol dimethyl ether, 30 parts of paraformaldehyde, 40 parts of 1,5-hexadiene, and one part of rhodium (III) chloride. The reactor was cooled and evacuated and pressured with a mixture of hydrogen and carbon monoxide in a 2:1 mole ratio to give an operating pressure of 450–980 atm. at 125–175° C. The reactants were shaken under these conditions for 16 hours and a pressure drop of 305 atm. was observed during the reaction period. There was recovered from the reactor 194 parts of red-brown liquid which was flash distilled to yield 169 parts of distillate and 20 parts of viscous higher-boiling materials. The distillate was fractionally distilled to yield eight parts of methanol, B.P. 64° C., $n_D^{25}$ 1.3314, identified by infrared analysis; 18 parts of ethane-1,2-diol, B.P. 188–209° C., $n_D^{25}$ 1.4347, identified by infrared analysis; 23 parts of a mixture of alcohols, diols, and carbonyl compounds, B.P. 209–279° C., $n_D^{25}$ 1.4347–1.4660, characterized by infrared analysis; 25 parts of octane-1,8-diol, B.P. 279–298° C. The phenyl urethane had a M.P. of 168–170° C. and a mixed M.P. of 164–169° C. with the phenyl urethane from a known sample of octane-1,8-diol.

[In the preceding examples some rearrangement of the double bonds occurred (a reaction known to be effected by these catalysts) and in consequence the normally solid $C_6$ and $C_8$ α,ω-alkanediols contained small amounts of isomers. However, as shown by nuclear magnetic resonance studies and preparation of the phenylurethanes, the major products were hexane-1,6-diol and octane-1,8-diol.]

EXAMPLE V

A pressure reactor was charged with 90 parts of diethylene glycol dimethyl ether, 55 parts of 2,5-dimethyl-2,4-hexadiene, 30 parts of paraformaldehyde, and one part of rhodium (III) chloride. The reactor was cooled and evacuated and pressured with a mixture of hydrogen and carbon monoxide in a 2:1 mole ratio to give an operating pressure of 1000 atm. at 210° C. The reactants were shaken under these conditions for 16 hours. There was recovered from the reactor 175 parts of viscous light green liquid which was flash distilled to give 162 parts of liquid boiling up to 162° C./1 mm. and 6 parts of very viscous material, B.P. 193–210° C./1.75 mm. By infrared analysis this material was shown to be a highly branched polyol which was found to have an empirical formula of $C_6H_{11}O$ and a molecular weight of 362. The lower-boiling distillate obtained from the flash distillation was then fractionally distilled to give 20 parts of branched chain alcohols, B.P. 230–260° C., $n_D^{25}$ 1.4481–1.4661, characterized by infrared analysis; 16 parts of a $C_{10}$ glycol, B.P. 260–275° C., $n_D^{25}$ 1.4677–1.4742, having a proton nuclear magnetic resonance spectrum consistent with a structure containing two hydroxyl and three methyl groups. This material, 2,2,5-trimethylheptane-1,7-diol, has the structure $HOCH_2CH_2C(CH_3)HCH_2CH_2C(CH_3)_2CH_2OH$ There was also obtained 12 parts of a mixture of $C_{10}$ glycols and esters, B.P. 275–320° C., $n_D^{25}$ 1.4742–1.4836.

EXAMPLE VI

A pressure reactor was charged with 100 parts of aqueous 37.2% formaldehyde and 1 part of rhodium (III) chloride. The reactor was cooled and evacuated, 28 parts of butadiene was distilled in, and the system was pressured with a mixture of hydrogen and carbon monoxide in a 2:1 mole ratio to give an operating pressure ranging from 700–1000 atm. at 150–190° C. The reactants were shaken under these conditions for 16 hrs. and a pressure drop of 265 atm. was observed. There was recovered from the reactor 140 parts of tan, two-phase liquid which was flash distilled to give 127 parts of two-phase distillate and 4 parts of residue. The two phases were separated; the lower phase, 56 parts, $n_D^{25}$ 1.3478, contained 0.0075 mole of acid. The upper phase, 71 parts, was fractionally distilled to give 32 parts of a mixture of alcohols and acetals, boiling range 145–235° C. (corr.), $n_D^{25}$ 1.4280–1.4820, identified by infrared analysis, and 8 parts of hexane-1,6-diol containing a carbonyl compound, B.P. 241–272° C., $n_D^{25}$ 1.4520–1.4638, shown by infrared analysis to be similar to the $C_6$-alkanediol obtained in Examples I and II.

The tabulation which follows shows that substitution of the catalysts listed in the middle column for the rhodium (III) chloride of Example I in the process of Example I produces the alkanediols listed in the right column.

Table I

| Example | Catalyst | Alkanediol |
| --- | --- | --- |
| VII | Rhodium (III) bromide | Hexane-1,6-diol. |
| VIII | Diruthenium nonacarbonyl | Do. |
| IX | Rhodium tetracarbonyl | Do. |
| X | Platinum (II) dichloride | Do. |
| XI | Palladium (II) bromide | Do. |
| XII | Osmium (III) chloride | Do. |
| XIII | Iridium (III) bromide | Do. |
| XIV | Rhodium (III) ethylacetoacetate | Do. |
| XV | Rhodium dicarbonyl chloride | Do. |
| XVI | Platinum (IV) chloride | Do. |

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. In a process for making alkanediols containing at least 5 carbon atoms per molecule and having the hydroxyl groups bonded to primary carbons, the step of reacting an acyclic diene hydrocarbon of up to 18 carbon atoms with carbon monoxide, formaldehyde, and hydrogen in the presence of a catalytic amount of at least one compound selected from the group consisting of salts, chelates, and carbonyls of group VIII noble metals while maintaining a temperature of 100° C. to 250° C. and a pressure of 100 to 3000 atmospheres, said amount being up to 15% by weight of total diene hydrocarbon present.

2. In a process for making alkanediols containing at least 5 carbon atoms and having the hydroxyl groups bonded to primary carbons, the step of reacting one mole of a diene hydrocarbon containing up to 18 carbon atoms with from 2 to 10 moles of carbon monoxide, 2 to 4 moles of formaldehyde, and 4 to 20 moles of hydrogen, in the presence of at least 1 catalytic compound selected from the group consisting of salts, chelates, and carbonyls of group VIII noble metals in an amount ranging from 0.0001 to 15 percent by weight diene hydrocarbon present, while maintaining a temperature of 100 to 250° C. and a pressure of 100 to 3000 atmospheres.

3. The process of claim 2 wherein the catalytic compound is rhodium (III) chloride.

4. The process of claim 2 wherein the catalytic compound is ruthenium (III) chloride.

5. The process of claim 2 wherein the diene hydrocarbon is selected from the group consisting of 1,3-butadiene, 1,4-hexadiene, 1,5-hexadiene and 2,5-dimethyl-2,4-hexadiene.

6. The process of claim 5 wherein the catalytic compound is rhodium (III) chloride.

7. In a process of preparing alkanediols of at least 5 carbon atoms and having the hydroxyl groups bonded to primary carbons, the step of reacting, at a temperature of 120 to 200° C. and a pressure of 200 to 3000 atmospheres, a diene hydrocarbon of up to seven carbon atoms with formaldehyde, carbon monoxide and hydrogen, the mole ratio of formaldehyde: carbon monoxide: diene hydrocarbon employed being 2:1:1, with hydrogen being present in an amount sufficient to provide at least a 1:1 mole ratio of hydrogen to each of the other three reactants, in the presence of a group VIII noble metal chloride, said chloride being present in an amount of 1–6% by weight of total diene hydrocarbon present.

References Cited in the file of this patent

UNITED STATES PATENTS

| | | |
|---|---|---|
| 2,449,001 | Mikeska et al. | Sept. 7, 1948 |
| 2,451,333 | Gresham et al. | Oct. 12, 1948 |
| 2,640,074 | Gresham et al. | May 26, 1953 |
| 2,880,241 | Hughes | Mar. 31, 1959 |